Nov. 13, 1945.  P. E. MERCIER  2,388,924
EXHAUST MANIFOLD FOR INTERNAL-COMBUSTION ENGINES
Filed May 4, 1943
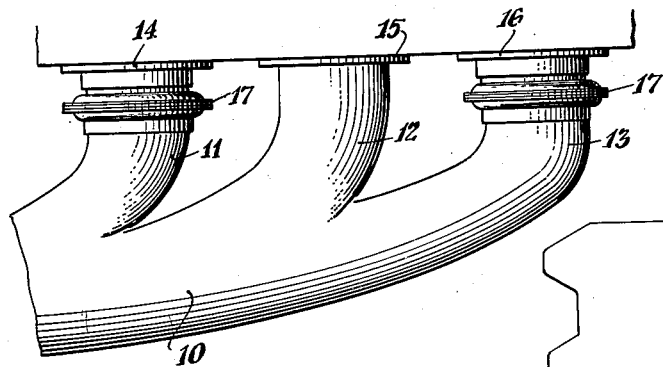
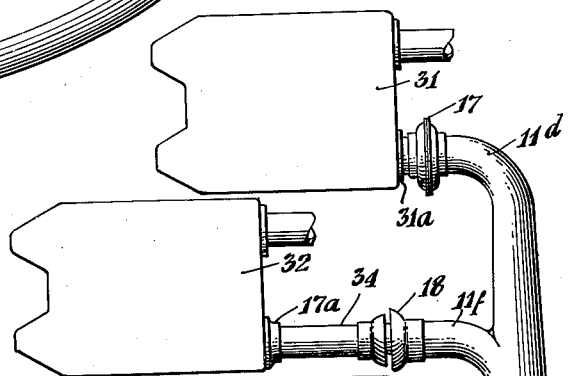
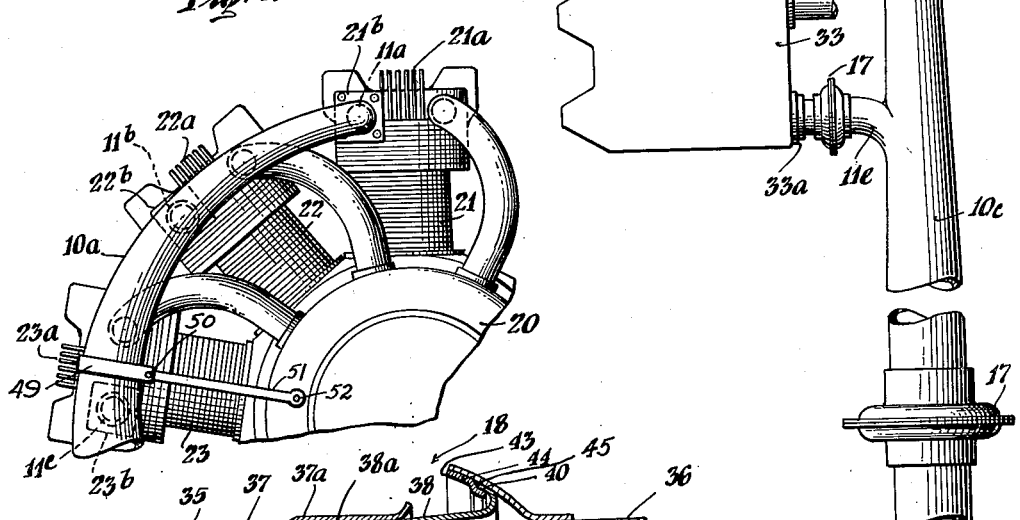
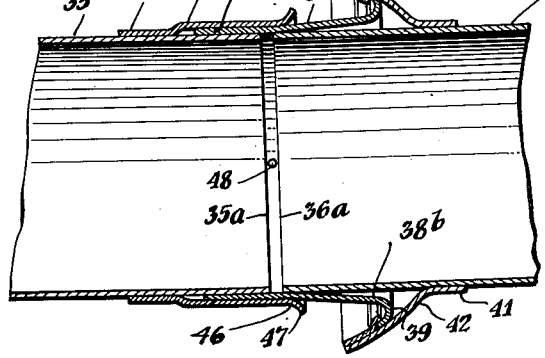
INVENTOR.
Pierre Ernest Mercier
BY
Hoguet, Neary & Campbell
ATTORNEYS Patented Nov. 13, 1945

2,388,924

UNITED STATES PATENT OFFICE 2,388,924

EXHAUST MANIFOLD FOR INTERNAL-COMBUSTION ENGINES

Pierre Ernest Mercier, New York, N. Y.

Application May 4, 1943, Serial No. 485,593

7 Claims. (Cl. 60—29)

This invention relates to improvements in exhaust manifolds for internal combustion engines, and particularly to exhaust manifolds of multi-cylinder engines for aircraft and other types of self-propelled vehicles wherein pronounced vibrations and stresses are apt to be set up in the connections of the manifold to the cylinders because of shocks imparted to the vehicle, unequal thermal expansion from the heat of the exhaust gases, and other incidents of the operation of the engine.

Exhaust manifold systems as heretofore employed in aircraft engines have taken different forms depending somewhat upon the type of engine and the space requirements. In some cases the manifold has been mounted directly adjacent the exhaust ports, and while this has proved to be an advantage from the standpoint of space economy, it has not been a good solution from the standpoint of facilitating cooling of the engine by the passing air. The disadvantages of such arrangements are increased when multi-row radial engines are involved. To improve the air cooling, therefore, many exhaust manifolds are disposed in spaced relation to the engine and connected to the individual exhaust ports by short individual pipe connections. However, this arrangement has created a problem of effecting gas tight connections with the engine cylinders that may be quickly and easily broken when it is desired to remove or replace the manifold. It is also found that stresses are set up between the elements of the connections due to vibrations and shocks and to unequal thermal expansion of the manifold branch pipes with respect to the manifold proper and the engine port connections with which they are joined. When such manifold structures are rigidly joined to the several engine cylinders as has been the practice in the past, failures eventually occur where the stress has become too great in one of the connections because of the combination of the above mentioned factors.

In my copending application Serial No. 424,219, now Patent No. 2,318,006, I have disclosed and claimed an improved coupling designed to establish a flexible connection between two conduits or between an exhaust manifold connecting pipe and an engine exhaust port. In my aforesaid patent I have also disclosed one form of the improved manifold structure being claimed herein, and to such extent this application is a continuation-in-part of my copending application aforesaid.

It is an object of the invention to provide an exhaust manifold with connections to the several cylinders of the engine that will insure that the manifold remains firmly secured in position to perform its function while at the same time permitting of limited freedom of movement at the connections sufficient to absorb vibrations and shocks and to compensate for unequal thermal expansion of the connecting pipes.

It is a further object of the invention to provide an exhaust manifold with individual connections to the cylinders that may be quickly and easily assembled without the use of bolts or rivets and which may be easily dismantled.

It is a still further object of the invention to provide an improved coupling between two adjacent pipes, such, for example, as used in an exhaust manifold system or between an exhaust manifold connection and an engine cylinder, and which coupling is designed to maintain a sealing relationship at the point of junction of the two pipes under varying conditions of temperature and of shock or vibration.

It is still another object of my invention to provide an improved coupling for exhaust manifold connections wherein thermal expansion caused by the hot gases is localized and controlled to promote the sealing effect of the elements making up the coupling.

The invention is illustrated by way of example in the accompanying drawing, in which:

Fig. 1 is a plan view partly broken away of an embodiment of my improved manifold with three branches designed for use with an in-line type of aircraft engine;

Fig. 2 is a partial rear elevation of a single row radial engine showing the application of my improved manifold thereto;

Fig. 3 is a schematic plan view of my manifold applied to a double row radial engine; and Fig. 4 is a longitudinal section illustrating certain features of the improved coupling used in the modification of Fig. 3.

Referring to Fig. 1, the manifold 10 is shown as having three branches 11, 12 and 13 connected by means of the flanges 14, 15 and 16 with three adjacent cylinders of an in-line engine. Although only three cylinders are shown, it will be understood that the arrangement will be similar when a larger number of cylinders are to be accommodated by a single manifold. As shown, the central branch pipe 12 of the manifold is rigidly connected to the cylinder head or other fixed part of the engine block according to design, by means of a central flange 15.

The two end branches 11 and 13 are connected to the head by means of flexible couplings 17 which permit of considerable relative movement of the ends of the branch pipes 11 and 13 both lengthwise of the axis of the engine port and the connection thereof with the manifold and which are also movable pivotally about a point defined roughly by the intersection of the longitudinal axis and a line passing through the plane of the coupling.

The couplings are shown as of the type described and claimed in my Patent No. 2,318,006, see Fig. 5 thereof, but it will be understood that they may be of any other suitable design combining the advantages of a limited flexibility and gas tightness in all conditions of operation. It will also be observed that the branches of the manifold are smoothly curved rearwardly where they merge in the body of the manifold which is progressively enlarged so as to accommodate the successive increments of exhaust gases without setting up undue turbulence in the flow thereof.

By rigidly connecting the manifold at only one cylinder while providing flange connections at the adjacent cylinders, the positioning of the manifold in a determined position with respect to the engine is assured, while at the same time the flexible couplings permit of adjustments of the relative positions of the branches 11 and 13 and the main body of the manifold with respect to the fixed central branch 12 under the influence of differences in the degree of expansion of the manifold connections on account of the different temperatures of the parts of the manifold and the parts to which they are connected by the flanges and the different temperatures of different manifold connections and the main body of the manifold under operating conditions.

In Fig. 2 my improved exhaust manifold mounting is shown as applied to a single row radial engine 20. The manifold 10a is shown as gradually expanded from its point of attachment to the cylinder 21 so as to accommodate in a simple manner and without creating back pressure the gases from the successive cylinders 22, 23, etc. The branch connections 11a, 11b and 11c to the respective cylinder heads 21a, 22a and 23a are made through the medium of attachment flanges carrying attachment plates 21b, 22b, and 23b mounted on the respective cylinder heads. The couplings by which the branches of the manifold are connected to the respective exhaust ports are not shown in this view, being back of the body of the exhaust manifold 10a. It will be understood, however, that they may take the form of the connections illustrated in Fig. 1, i. e., one connection being a rigid one and the others being of the flexible type shown in Fig. 1. If desired, the flexible connections may take the form of the coupling shown in Fig. 1 of my Patent No. 2,318,006 or another suitable design combining the advantages of the various flexible couplings illustrated in that patent or the form of the coupling shown in Fig. 4 herewith and more particularly described hereinafter.

Instead of providing one or more rigid connections between the manifold and the engine cylinders as hereinbefore described in referring to Figs. 1 and 2, it will be understood that it is within the scope of my invention to make all of the connections of the flexible type. When this is done, it will usually be necessary to provide some additional support for the manifold to insure that its position will be maintained under operating conditions, but such support need not involve rigid connections. In other words, the advantages of slight adjustability of the branch connections and of the manifold to one another under the varying heat expansion conditions may be maintained without setting up undue stresses in any of the elements of the manifold or between the manifold and other parts of the engine to which it is connected and with which it must cooperate. By way of example, the manifold may be supported by a bracket made up of the encircling band 49 attached at 50 to the support 51 which may be secured as at 52 to the housing of the engine 20 (see Fig. 2).

Fig. 3 is a somewhat exploded or schematic view showing the application of my improved manifold to a double row radial engine wherein the manifold 10c is shown as joined to three adjacent cylinders 31, 32 and 33. Cylinders 31 and 33 are located in the row nearest the exhaust manifold 10c and 32 is located in the row farthest from the exhaust manifold. The connections between the manifold and the exhaust ports of the nearest row of cylinders 31, 33, etc., consist of the branch pipes 11d and 11e joined through the couplings 17 to the respective engine port flanges 31a and 33a. The connections between the manifold and the exhaust ports of the farthest row of cylinders, which includes cylinder 32, are arranged through the intermediary of the junction pipe 34 which is connected at one end by a coupling 17a to the adjacent engine port flange and at the other end is connected to the branch pipe 11f by means of the flexible coupling 18. Coupling 17a may be of a conventional rigid form as shown or may take other forms, as for example that of the coupling shown in Fig. 1 or the coupling shown in Fig. 5 of my aforementioned patent.

Coupling 18 represents an improved construction which permits a considerable degree of lateral movement at the joint while at the same time insuring a tight sealing relationship between the parts at high temperatures. As shown in Fig. 4, the coupling is used to connect two pipes 35 and 36, the ends 35a and 36a of which are shown as spaced a short distance from one another to permit of pivoting action between the two pipes and also for lengthwise expansion. The coupling 18 consists of three main parts, namely a cylindrical collar 37 attached adjacent one end to the pipe 35 by welding, riveting or other suitable means. The main portion 37a is free and is slightly spaced concentrically from the outer surface of the pipe 35, forming therebetween an annular slot in which is received the end of a sealing collar 38 having at one end a cylindrical portion 38a adapted to snugly fit about the end of the pipe 35. This cylindrical portion merges into a slightly outwardly flared portion 38b which continues to expand until it is turned backwardly at 39 to form a locking ring 40.

Fixed to the pipe 36 at 41 there is a bell shaped member 42. This member is joined adjacent its outer end to an inwardly directed annular strip 44, which is slightly spaced from the member 42 on its side nearest the pipe 36, thereby forming a sealing groove 45. When assembled to form a joint or coupling, the turned back portion 39 of the sealing collar 38 is snugly fitted in the sealing groove 45 and at the other end the portion 38a is snugly received in the annular groove between the member 37a and the end of the pipe 35. The end of the collar 37 is flared outwardly at 46 to provide a thin cooling fin 47. In a similar manner the outwardly extending rim portion 43 of the member 42 serves to act as a cooling fin rapidly giving up heat to passing air and establishing a marked temperature gradient between the temperature of the gases passing through the pipe and the temperature at the rim 43.

Besides functioning to facilitate transfer of heat from the hot exhaust gases to the passing air, which may be circulated by means of a fan or other means, either solely for cooling purposes or to transfer heat from the exhaust gases to the incoming air used to maintain combustion of the fuel introduced into the engine cylinders, the structural arrangement illustrated serves the further important purpose of causing the sealing collar 38 to be sealed more tightly at its two ends during operation of the engine than during intervals when the engine is idle. This result may be visualized when it is borne in mind that as the collars are heated by the exhaust gases they will tend to expand more rapidly in the areas closer to the pipes 35 and 36 than in the outer areas where the cooling air has a change to pass over the extended fin surfaces. Because of the unequal expansion, there will be a tendency for the free end of the strip 44 to be pivoted counterclockwise, as viewed in Fig. 4, and press closer against the locking ring 40. Likewise the cooling fin 47 and the adjacent portions of the collar 37 will tend to expand less than the portions thereof closer to the connection with the end of the pipe 35. This will tend to cause the free end of the collar 37 to bear closer against the sealing member 38 at or adjacent the pivotal axis of the coupling, which is indicated at 48 in the drawing as located at a point in the longitudinal axes of the pipes 35 and 36 and approximately equi-distant from the adjacent ends of these pipes.

The coupling 18 will generally be made of relatively light gauge sheet metal, thus facilitating the transmission of heat to passing air by the fins and at the same time emphasizing the heat gradient between these fins and the temperature of the main portions of the elements of which these fins are a part. As a consequence a deforming action is established which promotes the sealing contact between the loose sealing collar and the adjacent attached collars.

It will be apparent that my improved coupling has the further advantage that it may be easily assembled without recourse to welding, riveting or bolting, and that it may be quickly dismantled when the engine is to be taken down for repairs or overhauling.

Although I have emphasized the pivoting action in the coupling, it will be understood that it has the additional attribute of permitting considerable lengthwise expansion and contraction without setting up undesired stresses in the pipes or joints thereof with the manifold of an internal combustion engine or with the flange connection to an engine exhaust port.

The coupling and the associations thereof in an exhaust manifold assembly may be modified in various respects without departing from the scope of the invention, which is not to be deemed as limited otherwise than as limited by the scope of the appended claims.

I claim:
1. In a multi-cylinder internal combustion engine; in combination, a common exhaust manifold for a plurality of cylinders having individual connecting conduits for the exhaust ports of said cylinders, one of said conduits being rigidly connected to its corresponding cylinder and another of said conduits being connected to its corresponding cylinder by a flexible coupling.

2. In a multi-cylinder internal combustion engine; in combination, a common exhaust manifold for a plurality of adjacently arranged cylinders having individual connecting conduits for the exhaust ports of said cylinders, said manifold being rigidly connected to said engine at only one of said conduits, and having adjustable connections therewith at said other conduits, whereby vibrations set up in the operation of said engine will not cause excessive stresses in the connections between said manifold and said engine.

3. In a multi-cylinder internal combustion engine; in combination, a common exhaust manifold for a plurality of adjacently arranged cylinders having individual connecting conduits for the exhaust ports of said cylinders, said conduits being curved outwardly and rearwardly and merging in a common enlarged conduit, and said manifold being rigidly connected to said engine at only one of said conduits, and having adjustable connections therewith at said other conduits, whereby vibrations set up in the operation of said engine will not cause excessive stresses in the connections between said manifold and said engine.

4. In a multi-cylinder internal combustion engine; in combination, a common exhaust manifold for a plurality of adjacently arranged cylinders having individual connecting conduits for the exhaust ports of said cylinders, and means establishing flexible connections between said connecting conduits and said engine cylinders.

5. In a multi-row radial aircraft engine; in combination, a common exhaust manifold for a plurality of adjacently arranged cylinders in part situated in one row and in part in an adjacent row of cylinders, said manifold having individual connecting conduits for the exhaust ports of said cylinders, and at least part of said individual connecting conduits being connected to their respective corresponding cylinders by flexible coupling means.

6. In a multi-row radial aircraft engine; in combination, a common exhaust manifold for a plurality of adjacently arranged cylinders in part situated in one row and in part in an adjacent row of cylinders, said manifold being arranged in spaced relation to said cylinders and having individual connecting pipes for the exhaust ports thereof, and flexible coupling means joining said connecting pipes to said exhaust ports, said coupling means being provided with outwardly projecting heat radiating surfaces adapted to facilitate transmission of heat from the gases passing therethrough to air circulated about said connecting pipes, and thereby promoting the cooling of said engine and reducing the heat gradient between the wall surfaces of said connecting pipes and the body of said manifold.

7. In a multi-row radial aircraft engine; in combination, a common exhaust manifold for a plurality of adjacently arranged cylinders in part situated in one row and in part in an adjacent row of cylinders, said manifold being arranged in spaced relation to said cylinders and having branch pipes integrally joined thereto at one end and connecting at their opposite ends to the individual exhaust ports of the adjacent row of cylinders through couplings which permit of limited pivotal and lengthwise movement of the branch pipes with respect to the engine exhaust ports with which they are respectively associated, and a second series of branch pipes each integrally joined at one end to the manifold and at the opposite end thereof being connected by a flexible coupling to an intermediate connecting pipe which in turn is connected to an exhaust port of the more distant row of cylinders.

PIERRE ERNEST MERCIER.